United States Patent
Chang et al.

(10) Patent No.: US 7,505,627 B2
(45) Date of Patent: Mar. 17, 2009

(54) APPARATUS AND METHOD FOR LETTER RECOGNITION

(75) Inventors: Sun-Hee Chang, Suwon-si (KR); Eun-Jin Ko, Suwon-si (KR); Bong-Jung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 716 days.

(21) Appl. No.: 10/893,281

(22) Filed: Jul. 16, 2004

(65) Prior Publication Data

US 2005/0089226 A1    Apr. 28, 2005

(30) Foreign Application Priority Data

Oct. 22, 2003    (KR) .................. 10-2003-0073785

(51) Int. Cl.
*G06K 9/00*    (2006.01)

(52) U.S. Cl. .................................. 382/181
(58) Field of Classification Search ............ 382/181, 382/182

See application file for complete search history.

(56) References Cited

U.S. PATENT DOCUMENTS 6,094,197 A * 7/2000 Buxton et al. ............... 715/863
6,104,317 A   8/2000 Panagrossi
6,231,252 B1 * 5/2001 Kitamura ..................... 400/484
6,491,630 B1 * 12/2002 Saccardo et al. ............. 600/437
7,088,340 B2 * 8/2006 Kato ............................ 345/168
7,145,554 B2 * 12/2006 Bachmann ................... 345/173

FOREIGN PATENT DOCUMENTS

| EP | 0 660 218 | 6/1995 |
| JP | 06-102985 | 4/1994 |
| JP | 09-016301 | 1/1997 |
| JP | 2001-325064 | 11/2001 |

* cited by examiner

*Primary Examiner*—Vikkram Bali
*Assistant Examiner*—Eueng-Nan Yeh
(74) *Attorney, Agent, or Firm*—The Farrell Law Firm, PC (57) ABSTRACT

Disclosed is a system for recognizing a language letter inputted in a pen drag direction without switching a language mode in a terminal equipped with a touch screen having a plurality of letter input areas displayed thereon. The letter input areas have first language consonant letters that are divided into a plurality of pairs of basic and extended consonant letters. The basic and extended consonant letters of the first language are correspondingly mapped and assigned to a second language. A consonant letters-assigned to a letter input area corresponding to a touch pen input and type is selected and displayed when the touch pen input is present on the letter input areas. When the touch pen input is a pen drag in a vowel letter direction and is present on the letter input areas previously assigned vowel letter of the first language is displayed according to the vowel letter direction.

21 Claims, 11 Drawing Sheets

| [1ST AREA]<br><ㅊ> c / <ㅅ,ㅆ> s | [2ND AREA]<br><ㅈ,ㅉ> j / <ㄱ,ㅋ> g | [3RD AREA]<br><ㅎ> h / <ㅋ> k |
|---|---|---|
| [4TH AREA]<br><ㄹ> l / <ㅍ> f | [5TH AREA]<br><ㅇ> r / <ㅌ> t | [6TH AREA]<br><ㅅ,ㅆ> x / <ㅈ,ㅉ> z |
| [7TH AREA]<br><ㅂ,ㅃ> b / <ㄷ,ㄸ> d | [8TH AREA]<br><ㅍ> p / <ㅋ> q | [9TH AREA]<br>delete |
| [10TH AREA]<br><ㄴ> n / <ㅁ> m | [11TH AREA]<br><ㅂ,ㅃ> v / <ㅇ> w | [12TH AREA]<br>space |

| [1ST AREA] <ㅈ>c / <ㅅ,ㅆ>s | [2ND AREA] <ㅊ,ㅉ>j / <ㄱ,ㅋ>g | [3RD AREA] <ㅎ>h / <ㅋ>k |
|---|---|---|
| [4TH AREA] <ㄹ>l / <ㅍ>f | [5TH AREA] <ㅇ>r / <ㅌ>t | [6TH AREA] <ㅅ,ㅆ>x / <ㅊ,ㅉ>z |
| [7TH AREA] <ㅁ,ㅃ>b / <ㄷ,ㄸ>d | [8TH AREA] <ㅍ>p / <ㅋ>q | [9TH AREA] DEL |
| [10TH AREA] <ㄴ>n / <ㅇ>m | [11TH AREA] <ㅂ,ㅃ>v / <ㅇ>w | [12TH AREA] SPACE |

Extended letter direction (502)
<ㅏ>a (508)
<ㅑ>e (506)
<ㅓ>y (510)
<ㅕ>o (514)
<ㅗ>u (512)
Direction of conversion to Korean language (500)

FIG.6A

| | <ㅓ/ㅕ> i | EXTENDED LETTER DIRECTION | |
|---|---|---|---|
| <ㅏ/ㅑ> a | [3RD AREA] <ㅎ> h / <ㅋ> k | | |
| | [2ND AREA] <ㅈ,ㅉ> j / <ㄱ,ㅋ> g | [6TH AREA] <ㅅ,ㅆ> x / <ㅈ,ㅉ> z | <—> y |
| | [5TH AREA] <ㅇ> / / <ㅌ> t | [9TH AREA] delete | <ㅜ/ㅠ> u |
| | [8TH AREA] <ㅍ> p / <ㅋ> q | [12TH AREA] space | |
| DIRECTION OF CONVERSION TO KOREAN LANGUAGE | [11TH AREA] <ㅂ,ㅃ> v / <ㅇ> w | | |
| [1ST AREA] <ㅈ> c / <ㅅ,ㅆ> s | | | <ㅗ/ㅛ> o |
| [4TH AREA] <ㄹ> l / <ㅍ> f | | | |
| [7TH AREA] <ㅂ,ㅃ> b / <ㄷ,ㄸ> d | | | |
| [10TH AREA] <ㄴ> n / <ㅁ> m | | | <ㅜ> |

FIG.6B

| ENGLISH LETTERS | INPUT METHODS |
| --- | --- |
| a | DRAG IN ↑ DIRECTION |
| b | CLICK ON 7TH AREA |
| c | CLICK ON 1ST AREA |
| d | DRAG IN → DIRECTION ON 7TH AREA |
| e | DRAG IN ↖ DIRECTION |
| f | DRAG IN → DIRECTION ON 4TH AREA |
| g | DRAG IN → DIRECTION ON 2ND AREA |
| h | CLICK ON 3RD AREA |
| i | DRAG IN ↗ DIRECTION |
| j | CLICK ON 2ND AREA |
| k | DRAG IN → DIRECTION ON 3RD AREA |
| l | CLICK ON 4TH AREA |
| m | DRAG IN → DIRECTION ON 10TH AREA |
| n | CLICK ON 10TH AREA |
| o | DRAG IN ↙ DIRECTION |
| p | CLICK ON 8TH AREA |
| q | DRAG IN → DIRECTION ON 8TH AREA |
| r | CLICK ON 5TH AREA |
| s | DRAG IN → DIRECTION ON 1ST AREA |
| t | DRAG IN → DIRECTION ON 5TH AREA |
| u | DRAG IN ↓ DIRECTION |
| v | CLICK ON 11TH AREA |
| w | DIRECTION ON 11TH AREA |
| x | CLICK ON 6TH AREA |
| y | DRAG IN ↘ DIRECTION |
| z | DRAG IN → DIRECTION ON 6TH AREA |

FIG.7

| KOREAN LETTERS | INPUT METHODS |
|---|---|
| ㄱ | DRAG IN → DIRECTION (g) ON 2ND AREA (j), AND DRAG IN ← DIRECTION (ㄱ) |
| ㄲ | DRAG IN → DIRECTION (g) ON 2ND AREA (j), DRAG IN ← DIRECTION (ㄱ), AND DRAG IN → DIRECTION (ㄲ) |
| ㄴ | DRAG IN ← DIRECTION (ㄴ) ON 10TH AREA (N) |
| ㄷ | DRAG IN → DIRECTION (d) ON 7TH AREA (b), AND DRAG IN ← DIRECTION (ㄷ) |
| ㄸ | DRAG IN → DIRECTION (d) ON 7TH AREA (b), DRAG IN ← DIRECTION (ㄷ), AND DRAG IN → DIRECTION (ㄸ) |
| ㄹ | DRAG IN ← DIRECTION (ㄹ) ON 4TH AREA (l) |
| ㅁ | DRAG IN → DIRECTION (m) ON 10TH AREA (n), AND DRAG IN ← DIRECTION (ㅁ) |
| ㅂ | DRAG IN ← DIRECTION (ㅂ) ON 7TH AREA (b) <br> DRAG IN ← DIRECTION (ㅂ) ON 11TH AREA (v) |
| ㅃ | DRAG IN ← DIRECTION (ㅂ) ON 7TH AREA (b), AND DRAG IN → DIRECTION (ㅃ) <br> DRAG IN ← DIRECTION (ㅂ) ON 11TH AREA (v), AND DRAG IN → DIRECTION (ㅃ) |
| ㅅ | DRAG IN ← DIRECTION (ㅅ) ON 6TH AREA (x) <br> DRAG IN → DIRECTION (s) ON 1ST AREA (c), AND DRAG IN ← DIRECTION (ㅅ) |
| ㅆ | DRAG IN ← DIRECTION (ㅅ) ON 6TH AREA (x, AND DRAG IN → DIRECTION (ㅆ) <br> DRAG IN → DIRECTION (s) ON 1ST AREA (c), DRAG IN ← DIRECTION (ㅅ), AND DRAG IN → DIRECTION (ㅆ) |
| ㅇ | DRAG IN → DIRECTION (o) ON 11TH AREA (v), AND DRAG IN ← DIRECTION (ㅇ) |
| ㅈ | DRAG IN → DIRECTION (z) ON 6TH AREA (x), AND DRAG IN ← DIRECTION (ㅈ) <br> DRAG IN ← DIRECTION (ㅈ) ON 2ND AREA (j) |
| ㅉ | DRAG IN → DIRECTION (z) ON 6TH AREA (x), DRAG IN ← DIRECTION (ㅈ), AND DRAG IN → DIRECTION (ㅉ) <br> DRAG IN ← DIRECTION (ㅈ) ON 2ND AREA (j), AND DRAG IN → DIRECTION (ㅉ) |
| ㅊ | DRAG IN ← DIRECTION (ㅊ) ON 1ST AREA (c) |
| ㅋ | DRAG IN → DIRECTION (q) ON 8TH AREA (p), AND DRAG IN ← DIRECTION (ㅋ) <br> DRAG IN → DIRECTION (k) ON 3RD AREA (h), AND DRAG IN ← DIRECTION (ㅋ) |
| ㅌ | DRAG IN → DIRECTION (t) ON 5TH AREA (r), AND DRAG IN ← DIRECTION (ㅌ) |
| ㅍ | DRAG IN ← DIRECTION (ㅍ) ON 8TH AREA (p) |
| ㅎ | DRAG IN ← DIRECTION (ㅎ) ON 3RD AREA (h) |
| ㅏ | DRAG IN ↑ DIRECTION (a) ON AREA AND DRAG IN ← DIRECTION (ㅏ) |
| ㅑ | DRAG IN ↑ DIRECTION (a) ON AREA, DRAG IN ← DIRECTION (ㅏ), AND DRAG IN → DIRECTION (ㅑ) |
| ㅓ | DRAG IN ↖ DIRECTION (e) ON AREA, AND DRAG IN ← DIRECTION (ㅓ) |
| ㅕ | DRAG IN ↖ DIRECTION (e) ON AREA, DRAG IN ← DIRECTION (ㅓ), AND DRAG IN → DIRECTION (ㅕ) |
| ㅗ | DRAG IN ↗ DIRECTION (o) ON AREA, AND DRAG IN ← DIRECTION (ㅗ) |
| ㅛ | DRAG IN ↗ DIRECTION (o) ON AREA, DRAG IN ← DIRECTION (ㅗ), AND DRAG IN → DIRECTION (ㅛ) |
| ㅜ | DRAG IN ↓ DIRECTION (u) ON AREA, AND DRAG IN ← DIRECTION (ㅜ) |
| ㅠ | DRAG IN ↓ DIRECTION (u) ON AREA, DRAG IN ← DIRECTION (ㅜ), AND DRAG IN → DIRECTION (ㅠ) |
| ㅡ | DRAG IN ↘ DIRECTION (y) ON AREA, AND DRAG IN ← DIRECTION (ㅡ) |
| ㅣ | DRAG IN ↗ DIRECTION (i) ON AREA, AND DRAG IN ← DIRECTION (ㅣ) |

FIG.8

| [1ST AREA]<br><さ> c / s <ざ> | [2ND AREA]<br><ざ> j / g <が> | [3RD AREA]<br><は> h / k <か> |
|---|---|---|
| [4TH AREA]<br><ら> l / t <ぱ> | [5TH AREA]<br><ら> r / t <た> | [6TH AREA]<br><さ> x / z <ざ> |
| [7TH AREA]<br><ぱ> b / d <だ> | [8TH AREA]<br><ぱ> p / q <か> | [9TH AREA]<br><ん> delete <CONVERSION TO SMALL-SIZED LETTER> |
| [10TH AREA]<br><な> n / m <ま> | [11TH AREA]<br><ぱ> v / w <わ> | [12TH AREA]<br>space <CONVERSION TO CHINESE CHARACTER> |

| JAPANESE CONSONANT LETTERS | INPUT METHODS |
|---|---|
| は (h) | DRAG IN ← DIRECTION ON 3RD AREA |
| ひ | DRAG IN ← DIRECTION ON 3RD AREA, AND DRAG IN ↗ DIRECTION |
| ふ | DRAG IN ← DIRECTION ON 3RD AREA, AND DRAG IN ↓ DIRECTION |
| へ | DRAG IN ← DIRECTION ON 3RD AREA, AND DRAG IN ↘ DIRECTION |
| ほ | DRAG IN ← DIRECTION ON 3RD AREA, AND DRAG IN ↙ DIRECTION |
| か (k) | DRAG IN → DIRECTION ON 3RD AREA |
| き | DRAG IN → DIRECTION ON 3RD AREA, DRAG IN ← DIRECTION, AND DRAG IN ↗ DIRECTION |
| く | DRAG IN → DIRECTION ON 3RD AREA, DRAG IN ← DIRECTION, AND DRAG IN ↓ DIRECTION |
| け | DRAG IN → DIRECTION ON 3RD AREA, DRAG IN ← DIRECTION, AND DRAG IN ↘ DIRECTION |
| こ | DRAG IN → DIRECTION ON 3RD AREA, DRAG IN ← DIRECTION, AND DRAG IN ↙ DIRECTION |
| わ (w) | DRAG IN → DIRECTION ON 11TH AREA, AND DRAG IN ← DIRECTION |
| を | DRAG IN → DIRECTION ON 11TH AREA, DRAG IN ← DIRECTION, AND DRAG IN ↙ DIRECTION |

FIG.11

| JAPANESE VOWEL LETTERS | INPUT METHODS |
|---|---|
| あ (a) | DRAG IN ↑ DIRECTION (a) AND DRAG IN ← DIRECTION (あ) |
| い (i) | DRAG IN ↗ DIRECTION (i) ON AREA, AND DRAG IN ← DIRECTION (い) |
| う (u) | DRAG IN ↓ DIRECTION (u) ON AREA, AND DRAG IN ← DIRECTION (う) |
| え (e) | DRAG IN ↖ DIRECTION (e) ON AREA, AND DRAG IN ← DIRECTION (え) |
| お (o) | DRAG IN ↙ DIRECTION (o) ON AREA, AND DRAG IN ← DIRECTION (お) |
| や (ya) | DRAG IN ↘ DIRECTION (y) ON AREA, DRAG IN ↑ DIRECTION (ya), AND DRAG IN ← DIRECTION (や) |
| ゆ (yu) | DRAG IN ↘ DIRECTION (y) ON AREA, DRAG IN ↓ DIRECTION (yu), AND DRAG IN ← DIRECTION (ゆ) |
| よ (yo) | DRAG IN ↘ DIRECTION (y) ON AREA, DRAG IN ↙ DIRECTION (yo), AND DRAG IN ← DIRECTION (よ) |

FIG.12

| SMALL-SIZED LETTER AND CHINESE CHARACTER | INPUT METHODS |
|---|---|
| "ん" | DRAG IN ← DIRECTION ON "DELETE" AREA, AND DRAG IN → DIRECTION |
| LONG SOUND MARK "-" | PEN DOWN ON POSITION OF SOFT KEYBOARD FOR 2 SECONDS OR MORE |
| SMALL-SIZED LETTER | DRAG IN ← DIRECTION ON "DELETE" AREA (THIS INPUT IS AVAILABLE WHEN PREVIOUSLY INPUT LETTER IS JAPANESE LETTER) |
| CONVERSION TO CHINESE CHARACTER | DRAG IN ← DIRECTION ON "SPACE" AREA (THIS INPUT IS AVAILABLE WHEN PREVIOUSLY INPUT LETTERS ARE JAPANESE LETTERS) |

FIG.13

APPARATUS AND METHOD FOR LETTER RECOGNITION

PRIORITY

This application claims priority to an application entitled "APPARATUS AND METHOD FOR LETTER RECOGNITION", filed in the Korean Intellectual Property Office on Oct. 22, 2003 and assigned Serial No. 2003-73785, the contents of which are hereby incorporated by reference.

BACKGROUND OF THE INVENTION

1. Field of the Invention

The present invention relates to a user interface, and more particularly to a letter-recognition apparatus and method for recognizing input letters according to pen drag directions without the need for a special operation for switching a language mode in a terminal equipped with a touch screen.

2. Description of the Related Art

Conventional letter input methods in terminals using a touch screen include a soft keyboard input method and a handwriting recognition method. The soft keyboard input method typically provides an input window based upon a keyboard form that is displayed on the touch screen of the terminal. Utilizing the input window, an input operation is carried out by a pen click. The handwriting recognition method is typically a method for recognizing a person's writing, i.e. recognizing handwritten letters and converting the recognized letters using a plurality of data codes.

Terminals equipped with a touch screen include, for example, an electronic organizer, a mobile phone, a personal digital assistant (PDA), etc. These terminals are miniaturized and lightweight, and hence their touch screens are miniaturized and of reduced weight.

It is, however, necessary to display all keys for inputting letters in terminals that use the soft keyboard input method. Thus, a size of the screen necessary for inputting letters must typically be increased. As the soft keyboard for inputting letters is displayed in a larger size, the size of a display area for displaying letters that the user has selected will relatively decrease. Therefore, users who are not familiar with which letters are assigned to soft keys must view the display area to confirm that a correct selection was made of the soft keys (typically in a one by one manner), resulting in an inconvenience to the user.

Further, the risk of erroneous selection of a different key positioned next to a desired key increases when the user must click on a small-sized key of the soft keyboard displayed on the small-sized touch screen using a pen, resulting in the need for the user to input the desired key again, further inconveniencing the user. Further still, where English language and Korean language letters are inputted together (or where English language and Japanese language letters are inputted together), that is, where letters based upon at least two languages are inputted together, conventional methods require a special operation for switching a language mode when letters of one language are inputted or when letters of the other language are inputted. This drawback of a mode switching operation arises when at least two languages are inputted together.

Because the user must handwrite each individual letter when using the handwriting recognition method, an input speed is slow and the user must perform many handwriting operations. Furthermore, if a desired letter to be inputted is not written correctly, an error may occur resulting in a different letter being inappropriately inputted, which can occur frequently. In this case, because the erroneously inputted letter must be deleted and then the desired letter must be inputted again, a problem of decreased input speed and accuracy exists.

As described above, because the screen conventionally displays the soft keyboard on most of a screen area, a display area for displaying inputted letters is often of insufficient size. Further, where letters are inputted according to two or more language modes, there is a problem in that a special language mode switching operation is required. Although the special language mode switching operation is unnecessary where letters are inputted using the handwriting recognition method, this method provides a slow input speed because the user must directly handwrite the letters. Also, when a letter is erroneously handwritten, an error in which an undesired letter can be inputted can occur frequently.

SUMMARY OF THE INVENTION

Therefore, the present invention has been made in view of the above problems, and it is one object of the present invention to provide an apparatus and method for letter recognition that can recognize language mode switching without need for a special operation for switching a language mode on a touch screen.

It is another object of the present invention to provide an apparatus and method for letter recognition that can recognize language mode switching according to a pen drag direction on a touch screen.

It is another object of the present invention to provide an apparatus and method for letter recognition that can reduce a size of a displayed soft keyboard used for letter input in a terminal equipped with a touch screen, and that can quickly input desired letters.

It is yet another object of the present invention to provide an apparatus and method for letter recognition that can quickly and correctly input desired letters at the time of inputting the letters.

In accordance with one aspect of the present invention, the above and other objects can be accomplished by the provision of an apparatus for letter recognition in a terminal equipped with a touch screen, comprising: a user interface having a plurality of letter input areas displayed on the touch screen, the letter input areas having first language consonant letters that are divided into a plurality of pairs of basic consonant letters and extended consonant letters of a first language assigned thereto, the basic consonant letters and the extended consonant letters of the first language being mapped and assigned to basic consonant letters and extended consonant letters of a second language; a display unit for displaying letters to be inputted by the user interface; and a controller for selecting one of the consonant letters assigned to a letter input area corresponding to a touch pen input according to a type of the touch pen input when the touch pen input is present on the letter input areas and enabling the display unit to display the selected consonant letter.

In accordance with another aspect of the present invention, the above and other objects can be accomplished by the provision of a method for letter recognition in a terminal equipped with a touch screen, comprising the steps of: (a) preparing a user interface having a plurality of letter input areas displayed on the touch screen, the letter input areas having first language consonant letters that are divided into a plurality of pairs of basic consonant letters and extended consonant letters of a first language assigned thereto, the basic consonant letters and the extended consonant letters of the first language being mapped and assigned to basic consonant letters and extended consonant letters of a second language; and (b) selecting one of the consonant letters assigned to a letter input area corresponding to a touch pen input according to a type of the touch pen input when the touch pen input is present on the letter input areas; and (c) enabling a display unit to display the selected consonant letter.

BRIEF DESCRIPTION OF THE DRAWINGS

The above and other objects, features and advantages of the present invention will be more clearly understood from the following detailed description taken in conjunction with the accompanying drawings, in which:

FIG. 8 is a table illustrating a method for inputting Korean letters on the touch screen in accordance with the first embodiment of the present invention;

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein is omitted to avoid making the subject matter of the present invention unclear.

A method for recognizing automatically inputted letters according to pen drag directions without a special operation for switching a language mode where at least two language modes are used together on a touch screen in accordance with the present invention will be described with reference to the annexed drawings. As an English letter and a Korean/Japanese letter corresponding to the pronunciation thereof are displayed on one key in accordance with the present invention, a user can easily remember and quickly input keys displayed on a soft keyboard.

Figure 1:
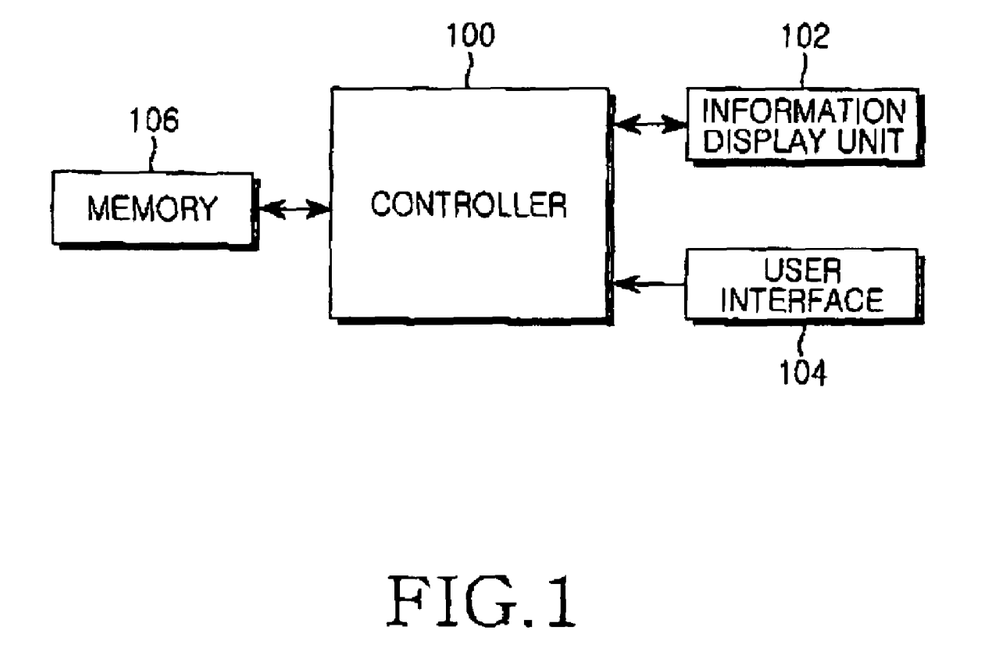
FIG. 1 is a block diagram illustrating the internal configuration of a terminal equipped with a touch screen in accordance with the present invention.

FIG. 1 is a block diagram illustrating the internal configuration of a terminal equipped with a touch screen in accordance with the present invention. The terminal to which the present is applied includes a controller 100, an information display unit 102, a user interface 104 and a memory 106. In accordance with the present invention, the user interface 104 consists of a touch screen. The touch screen displays a soft keyboard for a letter input. Furthermore, the user interface 104 outputs an input signal to the controller 100 when a touch pen input by a user is present. The controller 100 confirms a touch pen input type that is input through the user interface 104. That is, it is determined whether the touch pen input type is a pen click or drag. In accordance with the present invention, the controller 100 determines whether a basic consonant letter has been inputted, by a pen click. Furthermore, language mode switching is recognized by a pen drag for switching a language mode. An extended letter input is recognized by a pen drag for inputting a corresponding extended letter.

A configuration of the soft keyboard for inputting letters will be described with reference to FIG. 4 that shows the soft keyboard displayed on the touch screen, that is, the user interface 104, in accordance with the first embodiment of the present invention.

The soft keyboard includes twelve (i.e. $1^{st}$-$12^{th}$) areas. Furthermore, the $1^{st}$ to $12^{th}$ areas for a letter input are also referred to as letter input areas. Here, the letter input areas are displayed on the touch screen. Consonant letters of a first language that are divided into a plurality of pairs of basic consonant letters and extended consonant letters of the first language are assigned to the letter input areas. The basic consonant letters and the extended consonant letters of the first language are mapped and assigned to basic consonant letters and extended consonant letters of a second language.

In accordance with the present invention, the extended letters have forms similar to the basic letters. That is, an extended letter requires one or two additional strokes than are required to form a basic letter, has a left and right asymmetric form with respect to the basic letter, or has a repeat form of the basic letter. For example, an extended letter corresponding to a basic letter "c" is "s" being one more than the number of strokes thereof. Further, an extended letter corresponding to a basic letter "b" is "d", which has the right symmetric form with respect to the basic letter "b". Furthermore, an extended letter corresponding to a basic letter "n" is "m", which is a repeat form thereof. The memory 106 stores the basic letters and the extended letters mapped thereto. In a Korean/Japanese language, forms of extended letters are similar to those of basic letters.

A process for switching a language mode according to pen drag directions on the touch screen displaying the soft keyboard shown in FIG. 4 will be described with reference to FIG. 5. FIG. 5 is a diagram illustrating pen drag directions for inputting vowel letters, a pen drag direction for switching a language mode and pen drag directions for inputting extended letters in accordance with the first embodiment of the present invention.

Referring to FIG. 5, a direction 500 is a pen drag direction for switching an English language mode to a Korean language mode as a direction of conversion to the Korean language. For example, when a pen drag is carried out in the direction 500 as the direction of conversion to the Korean language on the 1$^{st}$ area shown in FIG. 4, a letter "ㅊ" can be inputted. That is, when a pen drag input is present in the direction 500 as the direction of conversion to the Korean language, the controller 100 recognizes the fact that the letter "ㅊ" has been inputted. Furthermore, a direction 502 is a pen drag direction for inputting an extended English/Korean letter as an extended letter direction. For example, when a pen drag is carried out in the direction 502 being the extended letter direction on the 1$^{st}$ area shown in FIG. 4, a letter "s" is inputted. Furthermore, when a pen drag is carried out in the direction 502 on the 2$^{nd}$ area, a letter "g" is inputted. That is, when a pen drag input is present in the extended letter direction 502 on each area, the controller 100 recognizes the fact that an extended letter has been inputted.

On the other hand, directions 504, 506, 508, 510, 512 and 514, i.e. directions other than the directions 500 and 502, are used for inputting vowel letters. Further, one English vowel letter is mapped to a Korean vowel letter corresponding to the pronunciation thereof in each direction. For example, when the pen drag is carried out in the direction 504, the controller 100 recognizes an input for an English vowel letter "e" and enables the information display unit 102 to display the letter "e". A Korean vowel letter "ㅓ/ㅕ", which is mapped to the English vowel letter "e", can be inputted by a pen drag in the direction 504 followed by another pen drag in the direction 500, which switches the language mode to the Korean language mode. At this time, the basic Korean vowel letter "ㅓ" can be inputted. Further, an extended Korean vowel letter "ㅕ" is inputted by performing another pen drag, with this further pen drag in the extended letter direction 502.

In order for an extended Korean vowel letter to be inputted, a corresponding English letter is first decided by a pen-down operation, and a basic Korean vowel letter is decided by a pen drag. Then, another pen drag is carried out in an extended letter direction and a pen-up operation is carried out, such that the extended Korean vowel letter can be inputted. The user must recognize a drag direction for inputting a Korean/English vowel letter or a drag direction for inputting an extended letter or switching the language mode to the Korean language mode on the soft keyboard displayed, such as shown in FIG. 4. However, because the user may not remember the above-described drag directions, the above-described drag directions can be displayed together with the soft keyboard as shown in FIGS. 6A and 6B.

Figure 6A:
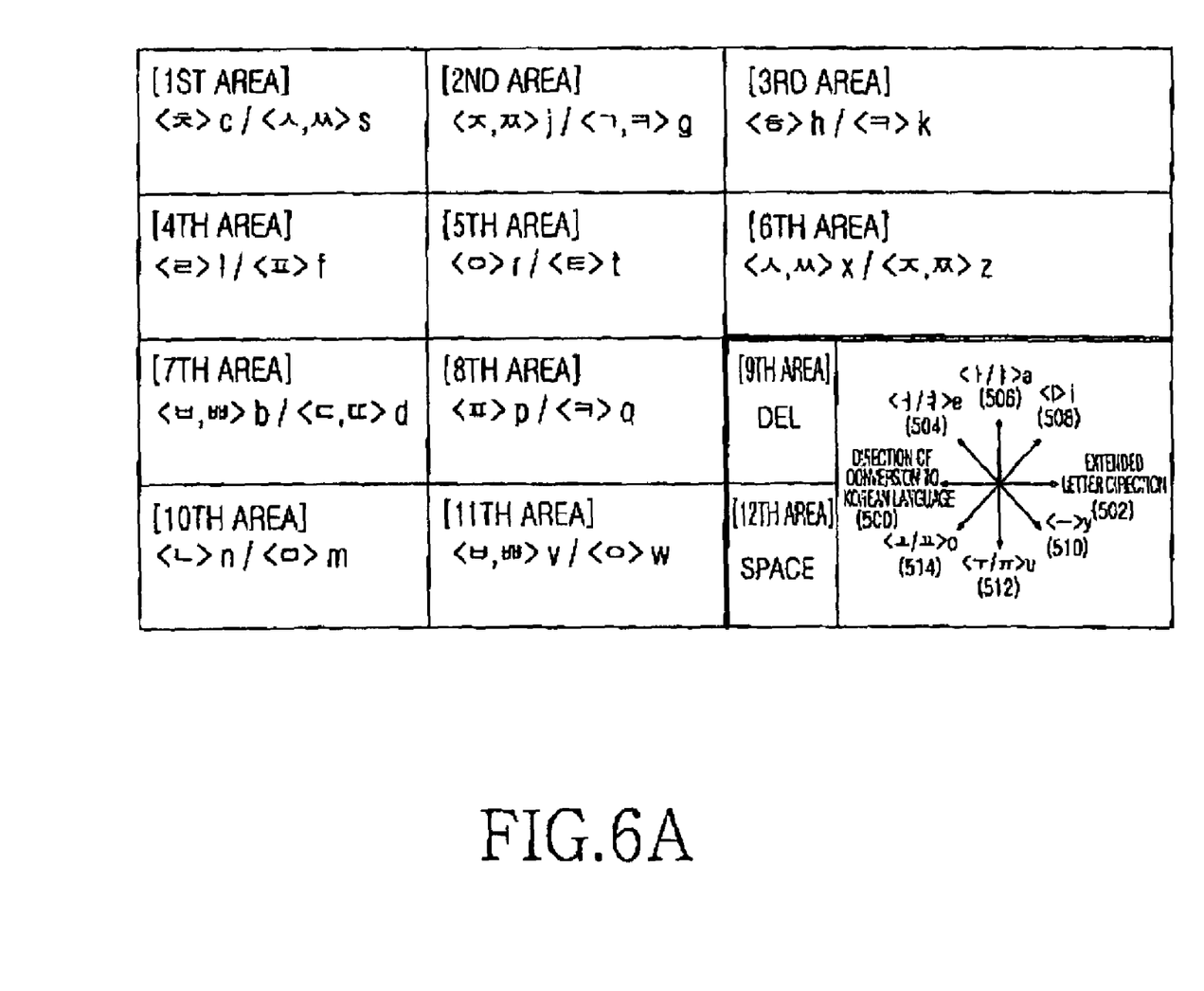
FIGS. 6A and 6B are diagrams illustrating soft keyboards that display pen drag directions for inputting Korean/English vowel letters, a pen drag direction for switching the language mode to the Korean language mode and pen drag directions for inputting extended letters in accordance with the first embodiment of the present invention.
Figure 6B:
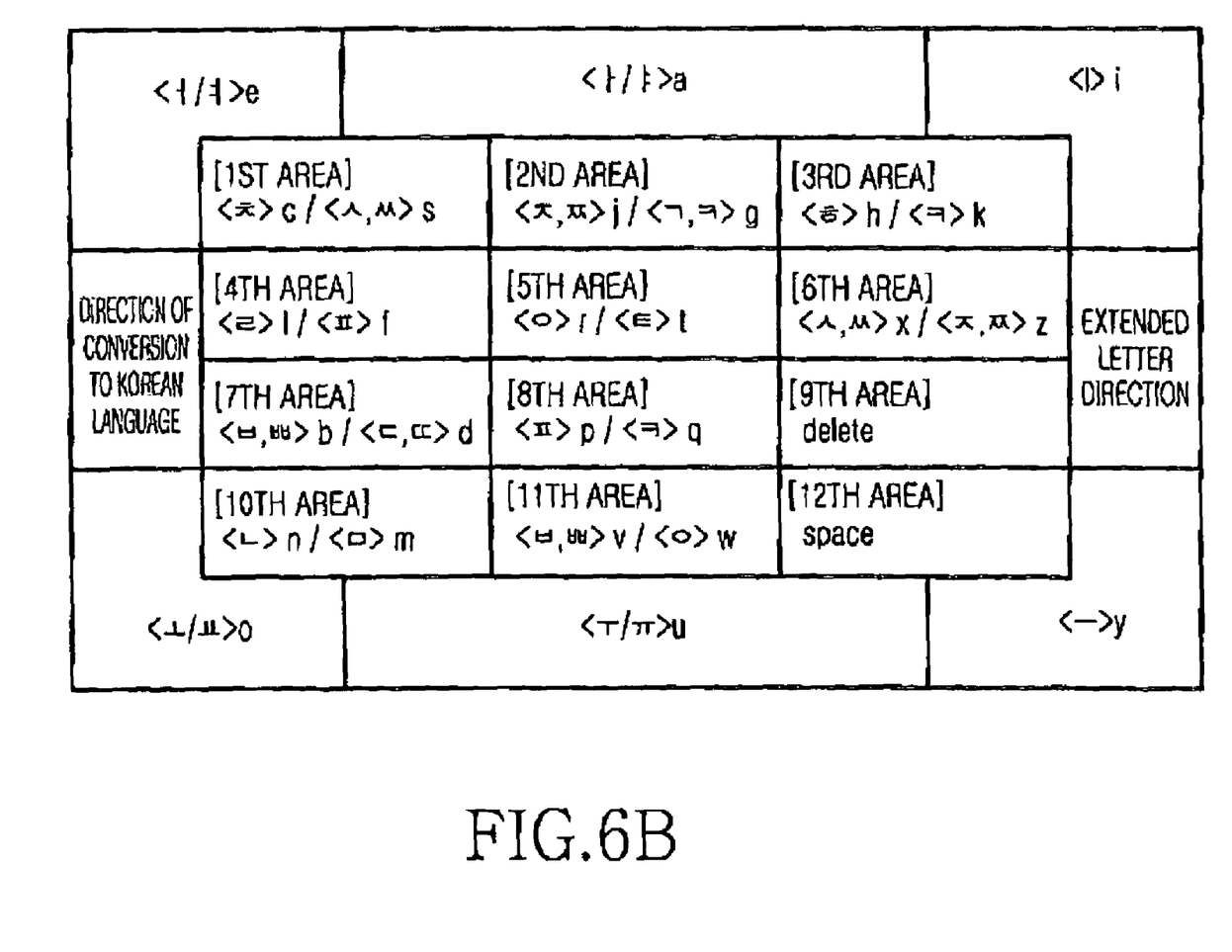

FIGS. 6A and 6B are alternative ways to display soft keyboards on the same screen with drag directions for inputting Korean/English vowel letters, a drag direction for switching the language mode to the Korean language mode, and drag directions for inputting extended letters. The user can easily recognize the extended letter direction, the direction of conversion to the Korean language and the directions for inputting vowel letters via operation of the soft keyboard displayed on the touch screen, as shown in FIGS. 6A and 6B.

Figure 2:
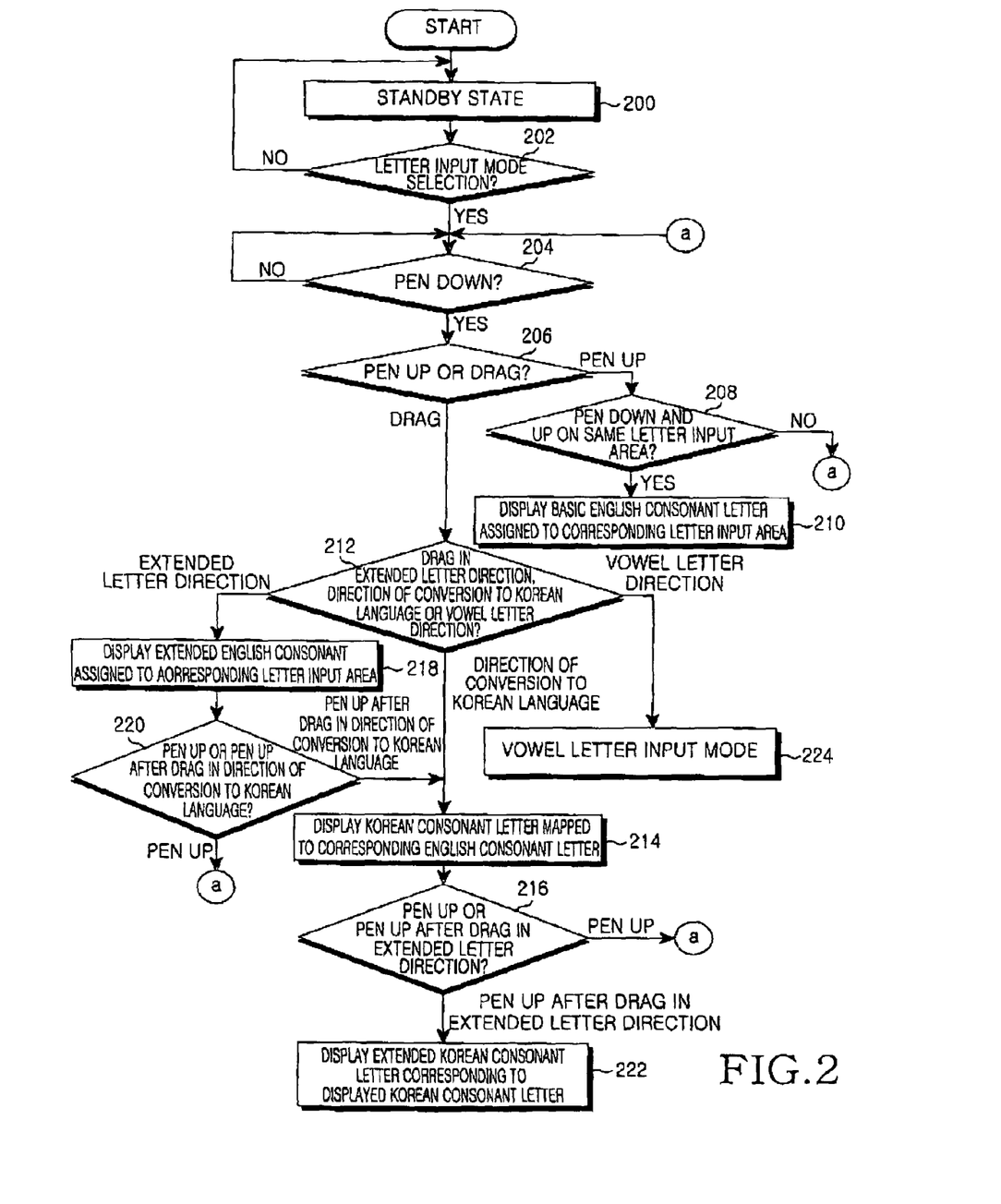
FIG. 2 is a flow chart illustrating a process for performing a control operation so that a Korean/English consonant letter inputted according to a pen drag direction is recognized in accordance with the first embodiment of the present invention.
Figure 4:
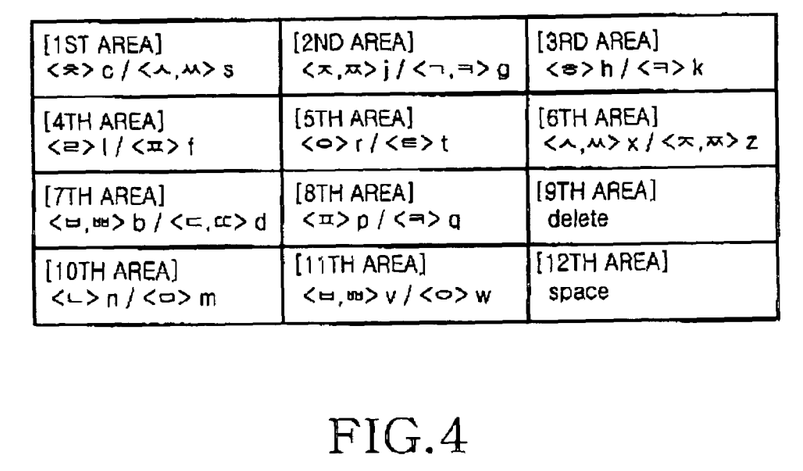
FIG. 4 is a diagram illustrating the screen of a soft keyboard displayed on a touch screen in accordance with the first embodiment of the present invention.
Figure 5:
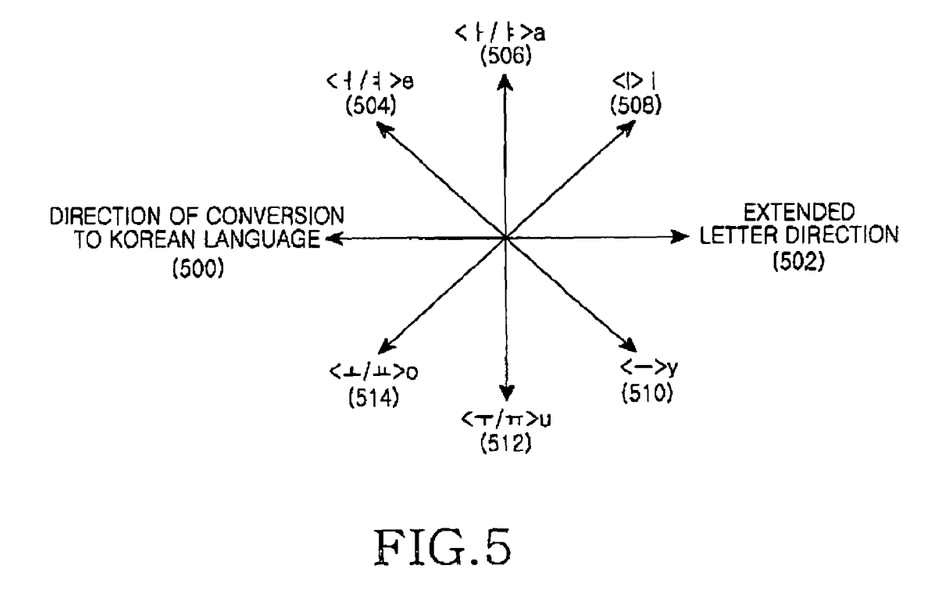
FIG. 5 is a diagram illustrating pen drag directions for inputting Korean/English vowel letters, a pen drag direction for switching a language mode to a Korean language mode and pen drag directions for inputting extended letters in accordance with the first embodiment of the present invention.

A process for recognizing a letter input when a letter is inputted through the soft keyboard displayed as shown in FIG. 4 will be described with reference to FIG. 2. FIG. 2 is a flow chart illustrating a process for performing a control operation so that a Korean/English consonant letter inputted according to a pen click and a pen drag direction can be discriminated and recognized in accordance with the first embodiment of the present invention.

First, the controller 100 determines, at step 202, whether an English letter input mode has been selected while maintaining a standby state at step 200. If the English letter input mode has been selected and inputted through the user interface 104 as a result of the determination, the controller 100 proceeds to step 204 and determines whether a pen-down operation has been performed. If the pen-down operation has been recognized, the controller 100 determines, at step 206, whether a pen-up operation has been performed or the pen-up operation has been performed after a pen drag operation.

If the pen-up operation is determined to have been performed, that is, a pen click has been performed once, the process proceeds to step 208. A determination is made as to whether the pen-down and pen-up operations have been performed on the same letter input area. If the pen-down and pen-up operations have been performed on the same letter input area as a result of the determination, the process proceeds to step 210. At this point, the controller 100 displays a basic English letter assigned to a corresponding letter input area. For example, when the pen click is present on the 1$^{st}$ area shown in FIG. 4, a basic letter "c" is displayed.

On the other hand, if the controller 100 recognizes at step 206 that the pen-up operation has been performed after a pen drag operation, the process proceeds to step 212 so that the pen drag direction can be determined. At this time, the pen drag direction can be any of directions 504, 506, 508, 510, 512 or 514 for inputting vowel letters, the extended letter direction 502, or the direction 500 for conversion to the Korean language, as shown in FIGS. 5, 6A and 6B.

If the pen drag has been performed in the extended letter direction 502 at step 212, the process proceeds to step 218 and an extended English consonant letter assigned to a corresponding letter input area is displayed. For example, if the pen-down operation has been performed on the 1$^{st}$ area at step 204 and then the pen drag has been performed in the extended letter direction, input of an extended letter "s", which is mapped to the letter "c", is recognized and then the "s" is displayed. Then, the controller 100 determines, at step 220, whether a pen-up operation has been performed or a further pen drag and a pen-up has been performed in the direction of conversion to the Korean language. That is, if it is determined that that only a pen-up operation has been performed, the "s" will be displayed by the user. If a further pen drag is carried out in the direction of conversion to the Korean language, and then a pen-up operation is carried out, the process proceeds to step 214. A basic Korean consonant letter "ㅅ", which is mapped to the English consonant letter "s", is displayed. Then, the process proceeds to the step 216.

At step 216 the controller 100 determines whether a pen-up operation has been performed or whether a pen drag in the extended letter direction 502 and a pen up operation have been performed. If it is determined that only a pen-up operation has been performed, the controller 100 determines, at the above step 204, whether a pen-down operation for inputting another letter has been performed in a state that the Korean consonant letter has been displayed at the above step 214. On the other hand, if the pen drag has been performed in the extended letter direction 502 and the pen-up operation has been performed at the above step 216, an extended Korean consonant letter mapped to the displayed Korean consonant letter is displayed at step 222. That is, if the pen drag has been performed in the extended letter direction 502 and then the pen-up operation has been performed in a state in which the basic Korean consonant letter "ㅅ" has been displayed, the "ㅅ" is converted into "ㅆ" and then the "ㅆ" is displayed.

If the controller 100 recognizes that the pen drag has been performed in the direction 500 at the above step 212, the process proceeds directly to step 214. The controller 100 displays a Korean consonant letter mapped to the selected letter input area. That is, if the pen-down operation has been performed on the 1st letter input area and then the pen drag has been performed in the direction 500 at the above step 204, a basic Korean consonant letter "ㅊ" mapped to the letter "c" is inputted and then the "ㅊ" is displayed. Then, the controller 100 determines, at the above step 216, whether a pen-up operation has been performed or whether a pen drag has been performed in the extended letter direction 502 followed by a pen-up operation. Then, if it is determined that only the pen-up operation has been performed, the controller 100 determines, at the above step 204, whether a pen-down operation for inputting another letter has been performed in a state in which the Korean consonant letter has been displayed at the above step 214.

On the other hand, if it is determined that the pen-up operation has been performed after a pen drag has been performed in the extended letter direction 502, an extended Korean consonant letter mapped to the displayed Korean consonant letter is displayed at step 222. That is, if the pen drag is performed in the extended letter direction 502 and then the pen-up operation is performed in a state in which the basic Korean consonant letter "ㅊ" has been displayed, the "ㅊ" is converted into "ㅅ" and the "ㅅ" is displayed. Then, if a pen drag is performed again in the extended letter direction and then a pen-up operation is performed in a state in which the "ㅅ" has been displayed, the "ㅆ" is displayed. This further step is not shown in FIG. 2.

As a third alternative in step 212, if the controller 100 recognizes that a pen drag has been performed in a any of the vowel letter directions 504, 506, 508, 510, 512 or 514, the process proceeds to step 224, such that a vowel letter input mode is performed.

Figure 3:
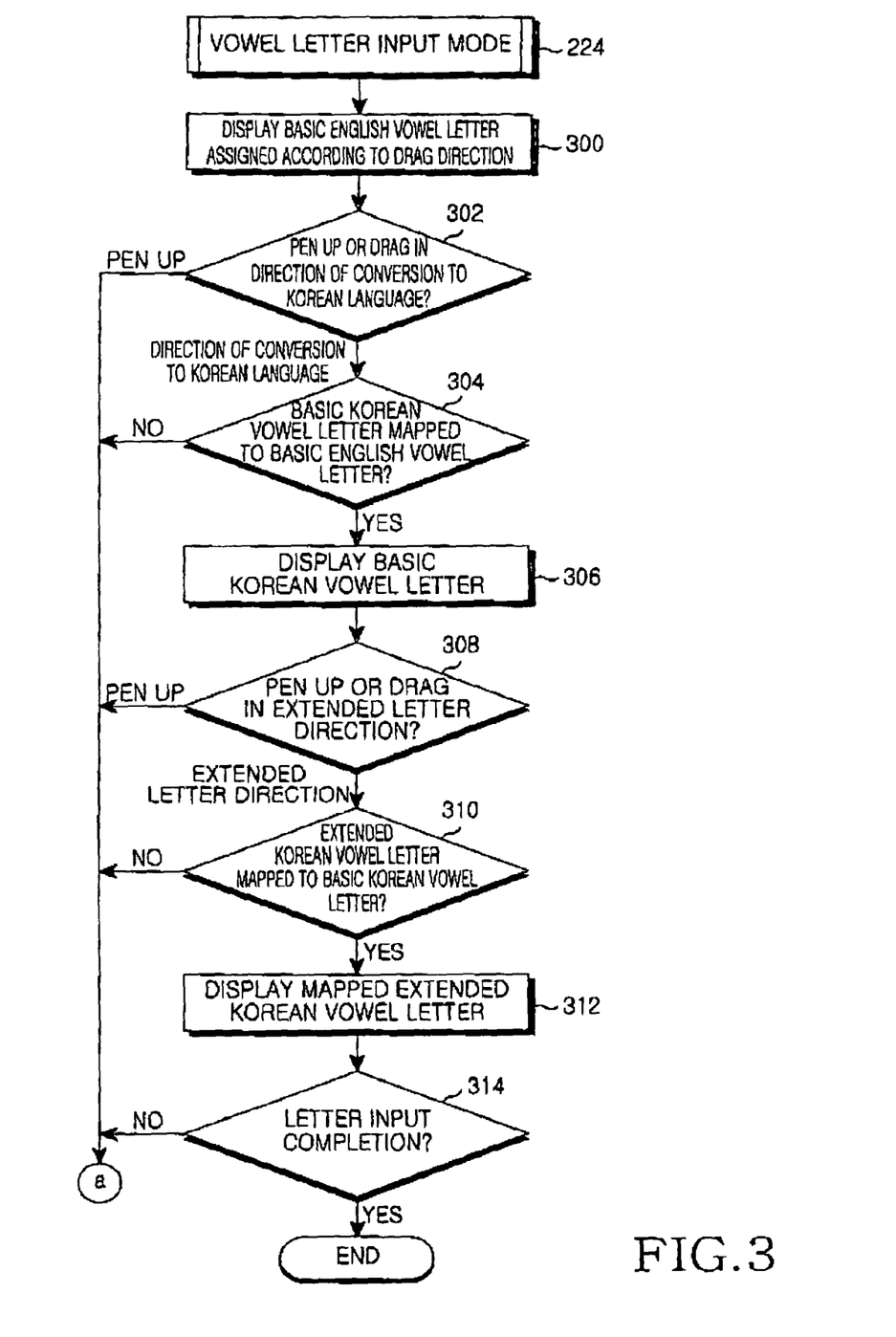
FIG. 3 is a flow chart illustrating a process for performing a control operation so that a Korean/English vowel letter inputted according to a pen drag direction is recognized in accordance with the first embodiment of the present invention.

The vowel letter input mode will be described with reference to FIG. 3. FIG. 3 is a flow chart illustrating a process for performing a control operation so that a Korean/English vowel letter inputted according to a pen drag direction is discriminated and recognized in accordance with the embodiment of the present invention. First, when the vowel letter input mode is performed at the above step 224 of FIG. 2, the controller 100 enables an English vowel letter assigned according to a pen drag direction to be displayed at step 300. For example, when the controller 100 recognizes the fact that a pen drag input has been performed in the direction 506, the English letter "a" is displayed. Then, a determination is made as to whether a pen-up operation has been performed or whether a pen drag has been performed in the direction 500 of conversion to the Korean language at step 302. If only the pen-up operation has been performed, the process proceeds to the above step 204, as described above in regard to FIG. 2, such that it is determined whether a pen-down operation for inputting another letter has been performed.

On the other hand, if it is determined that the pen drag has also been performed in the direction 500 of conversion to the Korean language, the process proceeds to step 304, such that a determination is made as to whether a basic Korean vowel letter mapped to a basic English vowel letter is present. If the mapped basic Korean vowel letter is present, the process proceeds to step 306, such that a corresponding Korean vowel letter is displayed. For example, if a pen drag is first performed in the "506" direction and then a pen drag is performed in the "500" direction, the English vowel "a" will first be displayed and then a basic Korean vowel letter "ㅏ", which is mapped to the English vowel "a", is displayed.

Then, the controller 100 determines, at step 308, whether the pen-up operation has been performed or whether a further pen drag has been performed in the extended letter direction 502. If it is determined that only the pen-up operation has been performed at the above step 308, the process proceeds to the above step 204 to wait to receive another letter, and the basic Korean vowel letter "ㅏ" is been displayed. On the other hand, if it is determined that a pen drag has been performed in the extended letter direction 502 at the above step 308, the process proceeds to step 310, such that the controller 100 determines whether an extended Korean vowel letter mapped to the basic Korean vowel letter is present. If the extended Korean vowel letter mapped to the basic Korean vowel letter is present, the process proceeds to step 312, such that the mapped extended Korean vowel letter is displayed. For example, if the pen drag has been performed and the pen-up operation has been performed when the basic Korean vowel letter "ㅏ" has been displayed at the above step 308, "ㅑ" is displayed in place of the "ㅏ". Then, when a signal for terminating the letter input process is inputted at step 314, the process is terminated. Otherwise, the process proceeds to the above step 204, such that the controller 100 waits to receive another letter input.

Figure 7:
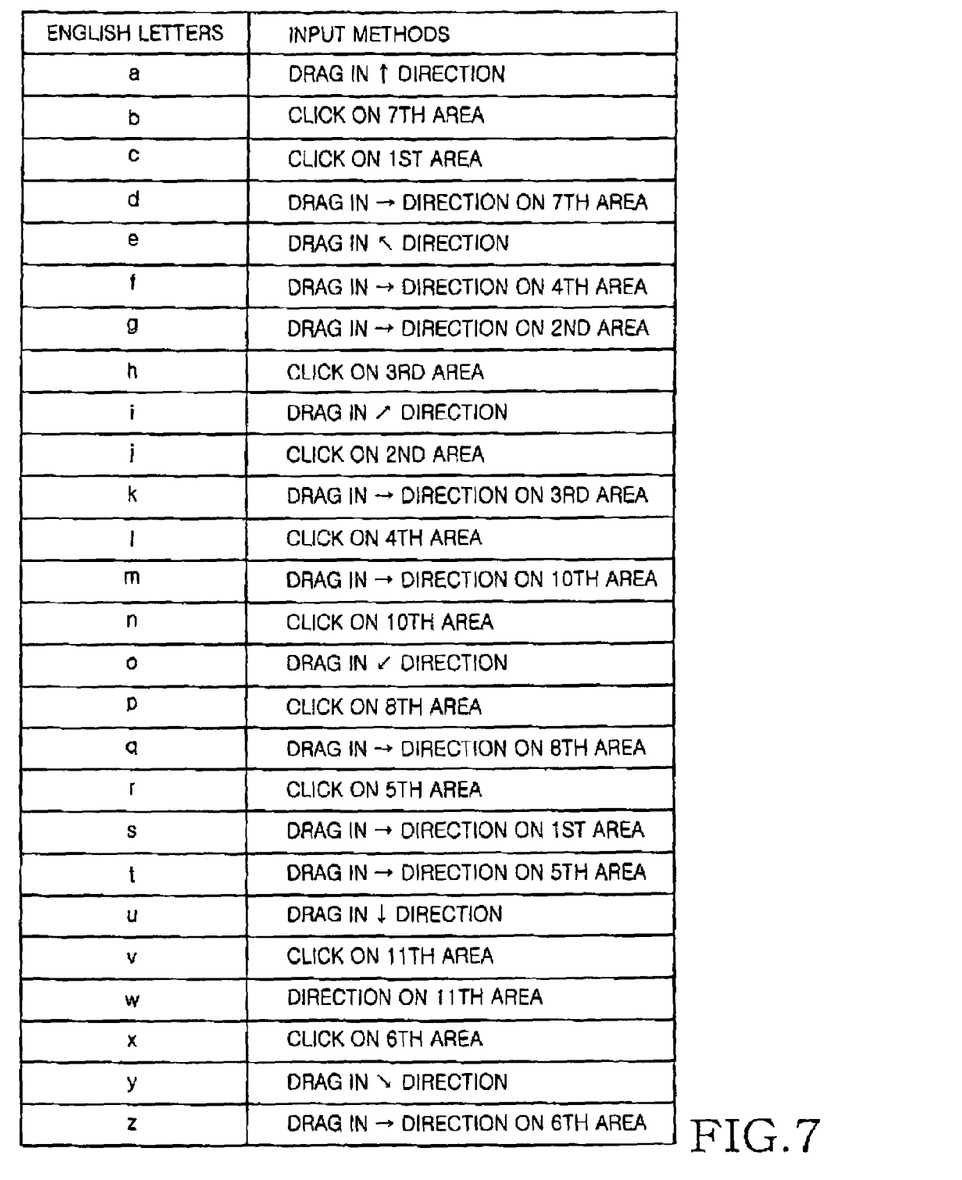
FIG. 7 is a table illustrating a method for inputting English letters on the touch screen in accordance with the first embodiment of the present invention.

The example of inputting English letters as shown in FIGS. 2 and 3 will be further described with reference to FIG. 7. FIG. 7 is a table illustrating a method for inputting the English letters on the touch screen in accordance with the first embodiment of the present invention. For example, if a pen drag has been performed in the "506" direction on any key, or letter, input area of the soft keyboard and then the pen-up operation has been performed, a letter "a" is inputted. For example, if a pen drag has been performed in the extended letter direction 502 on the 10th area of the soft keyboard shown in FIG. 4 and then a pen-up operation has been performed, "m" is inputted. Furthermore, if a pen click has been performed on the 3rd area of the soft keyboard shown in FIG. 4, "h" is inputted.

An example of inputting Korean letters, as described above in regard in FIGS. 2 and 3, will be further described with reference to FIG. 8. FIG. 8 is a table illustrating a method for inputting the Korean letters on the touch screen in accordance with an embodiment of the present invention. For example, when "ㅊ" is inputted, a pen-down operation is performed on the 1st area to select an English letter "c", a pen drag is performed in the direction 500 of conversion to the Korean language, and a pen-up operation is performed after it is confirmed that the English letter "c" is converted into the "ㅊ". Furthermore, when an extended letter "ㅅ" corresponding to the "ㅊ" is to be inputted, a pen-down operation is performed on the 1st area to select the English letter "c", the pen drag is performed in the direction 500 of conversion to the Korean language, thereby converting the English letter "c" into " ㅊ ", a pen drag is performed in the extended letter direction 502, and a pen-up operation is performed after it is confirmed that the " ㅊ " is converted into the extended letter " ㅅ ".

Where Korean and English letters are inputted together in accordance with the first embodiment of the present invention as described above, the controller can recognize the Korean and English letters according to pen drag input directions without a special operation for switching a Korean/English language mode.

Figure 9:
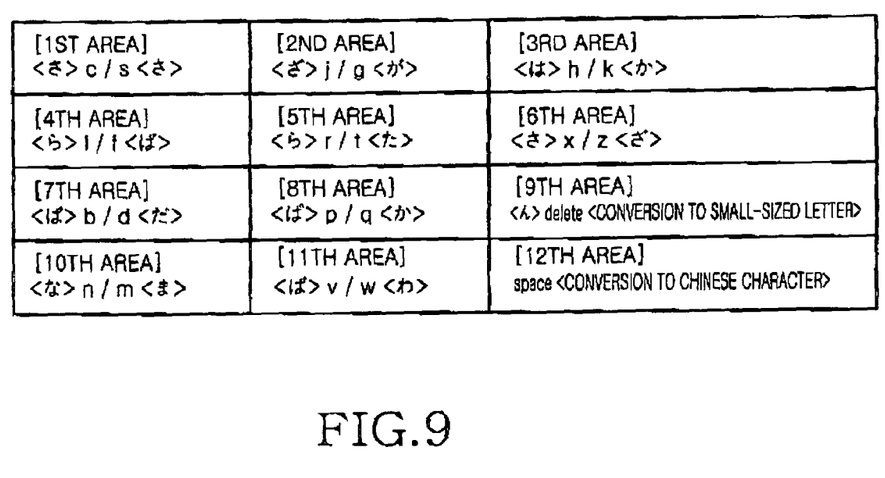
FIG. 9 is a diagram illustrating a soft keyboard displayed on the touch screen in accordance with the second embodiment of the present invention.

An example of switching a Japanese/English language mode will now be described in accordance with another embodiment of the present invention. FIG. 9 is a diagram illustrating a soft keyboard displayed on the touch screen in accordance with the second embodiment of the present invention. Referring to the soft keyboard displayed on the touch screen, that is, the user interface 104, in accordance with the second embodiment of the present invention, the soft keyboard includes 12 letter input areas necessary for inputting English/Japanese characters/letters and performing functions.

Basic consonant letters and extended letters are assigned to the letter input areas. Forms of the extended letters are similar to those of the basic letters. That is, an extended letter requires one or two additional strokes than are required to form a basic letter, has a left and right symmetric form with respect to the basic letter, or has a repeat form of the basic letter. A pair of a basic letter and an extended letter is assigned to one letter input area. The assigned letter input areas as described above are displayed on the touch screen. As shown in FIG. 9, the basic letters and the extended letters associated with the English language are displayed on the touch screen. For example, an extended letter being one more than a basic letter "c" is "s" on the 1st area, and an extended letter having a left and right symmetric form with respect to the basic letter "b" is "d" on the 7th area. Furthermore, an extended letter having the repeat form of a basic letter "n" is "m" on the 10th area.

The basic letters and the extended letters assigned in relation to the English language are mapped to basic letters and extended letters associated with the Japanese language. Japanese letter " さ ", which corresponds to the pronunciations of both the basic consonant letter "c" and the extended letter "s", is assigned to the 1st area. That is, the Japanese letters are mapped to the English letters corresponding to the pronunciations thereof in the letter input areas shown. For example, as shown in FIG. 9, "k" and "q" are both mapped to " か"; "g" is mapped to " か"; "s", "c" and "x" are all mapped to " さ "; "z" and "j" are both mapped to " ざ"; "t" is mapped to " た"; "d" is mapped to " だ "; "n" is mapped to " な", "h" is mapped to " は "; "b" and "v" are both mapped to " ば"; "p" and "f" are both mapped to " ぱ"; "m" is mapped to " ま"; "r" and "l" are both mapped to " ら "; and "w" is mapped to " わ".

Figure 10:
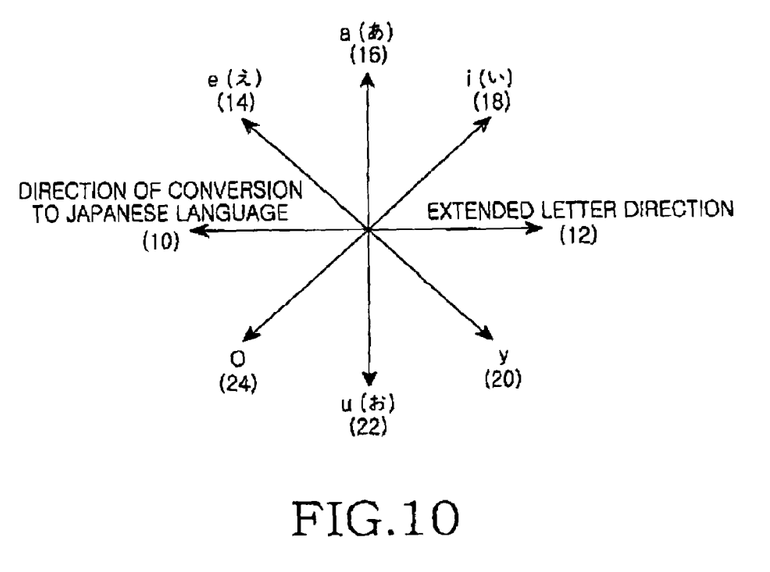
FIG. 10 is a diagram illustrating pen drag directions for inputting Japanese/English vowel letters, a pen drag direction for switching a language mode to a Japanese language mode and pen drag directions for inputting extended letters in accordance with the second embodiment of the present invention.

A process for switching the language mode and inputting an extended letter according to a pen drag direction on the touch screen on which the soft keyboard shown in FIG. 9 is displayed will be described with reference to FIG. 10. FIG. 10 shows pen drag directions for inputting vowel letters, a pen drag direction for switching the language mode to the Japanese language mode and pen drag directions for inputting extended letters in accordance with the second embodiment of the present invention.

Referring to FIG. 10, a direction 10 is a pen drag direction for switching the English language mode to the Japanese language mode. For example, when a pen drag is performed in the direction 10 on the 1st area, " さ " can be inputted. That is, when a pen drag input is performed in the direction 10 on the 1st area, the controller 100 recognizes the fact that the " さ " has been inputted. Additionally, a direction 12 is a pen drag direction for inputting an extended English/Japanese letter as the extended letter direction. For example, when the pen drag is performed in the direction 12 being the extended letter direction on the 1st area shown in FIG. 9, the English letter "s" can be inputted. When the pen drag is performed in the direction 12 on the 2nd area, the English letter "g" can be inputted.

Furthermore, when the pen drag is performed in the direction 10 on the 1st area shown in FIG. 9, the " さ " is inputted. Because, as explained above, Japanese letter " さ " corresponds to the pronunciations of both the basic consonant letter "c" and the extended letter "s", the basic and extended Japanese letters in the 1st area are the same. Accordingly, when the pen drag is performed in the direction 12 being the extended letter direction, the " さ " is also inputted as the extended letter. That is, when the pen drag input is performed in the extended letter direction 12 on each area, the controller 100 recognizes the fact that a corresponding extended letter mapped to a basic letter has been inputted.

Furthermore, any of directions 14, 16, 18, 20, 22 or 24 can be used for inputting vowel letters. One English vowel letter is mapped and assigned to one Japanese vowel letter corresponding to the pronunciation thereof in respective drag directions. For example, when the pen drag input is performed in the direction 14, the controller 100 recognizes an input for displaying an English vowel letter "e" and enables the information display unit 102 to display the "e". If a pen drag is performed in the direction 14 and then another pen drag is performed in the direction 10, a Japanese vowel letter " え", which is mapped to the English vowel letter "e", is inputted.

Figure 12:
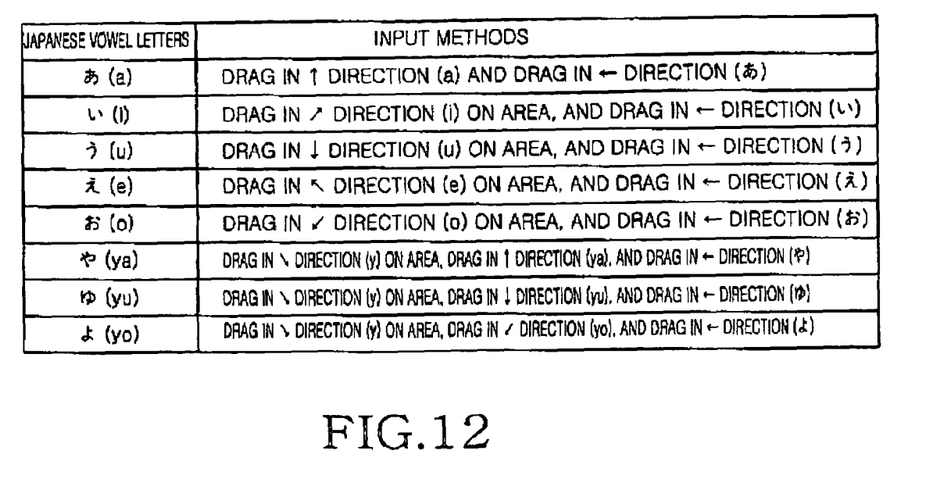
FIG. 12 is a table illustrating a method for inputting Japanese vowel letters on the touch screen in accordance with the second embodiment of the present invention.

A Japanese vowel letter corresponding to an English vowel letter assigned in each of the additional directions 16, 18 and 22 can be inputted when an English vowel letter assigned in a pen drag direction is inputted and a pen drag is performed in a direction of conversion to the Japanese language. A method for inputting the Japanese vowel letters is shown in the table provided at FIG. 12.

Figure 11:
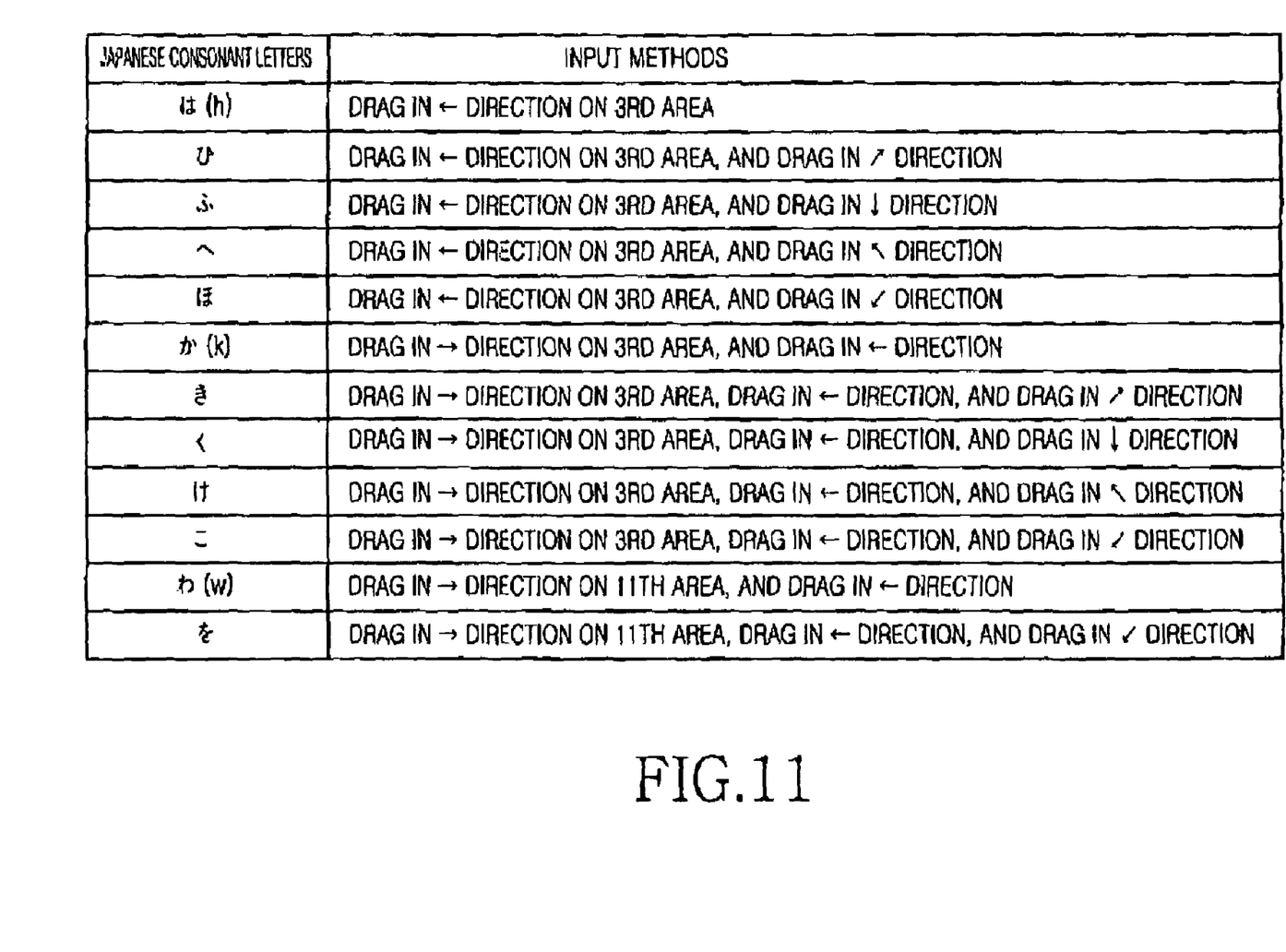
FIG. 11 is a table illustrating a method for inputting Japanese consonant letters on the touch screen in accordance with the second embodiment of the present invention.

The method for inputting the English letters according to FIGS. 9 and 10 is similar to the method described in FIG. 7. An example of inputting Japanese consonant letters, some of which are not shown in FIGS. 9 and 10, will be described with reference to FIG. 11. FIG. 11 is a table showing a method for inputting the Japanese consonant letters on the touch screen in accordance with the second embodiment of the present invention. For example, to input " は ", a pen-down operation is performed on the 3rd area, thereby selecting an English letter "h", a pen drag is performed in the direction 10, thereby converting to the Japanese language, and a pen-up operation is performed after it is confirmed that the "h" is converted to the " は ".

To input the additional Japanese character " ひ" (shown in FIG. 11), the pen-down operation is performed in the 3rd area, thereby selecting the English letter "h", a pen drag is performed in the direction 10, thereby converting to the Japanese language, a pen-up operation is performed after it is confirmed that the "h" is converted into "は", a pen drag is performed in the direction 18, and the pen-up operation is performed.

Furthermore, to input "か", which is mapped to both "k" and "q", a pen-down operation is performed in either the 3$^{rd}$ or 8$^{th}$ area, a pen drag is performed in the extended letter direction 12, and a pen drag is performed in the direction 10, thereby converting to the Japanese language mode.

FIG. 11 shows a method for inputting other Japanese consonant letters assigned to the 3$^{rd}$ and 11$^{th}$ areas, but the method can also be applied to other letter input areas.

Figure 13:
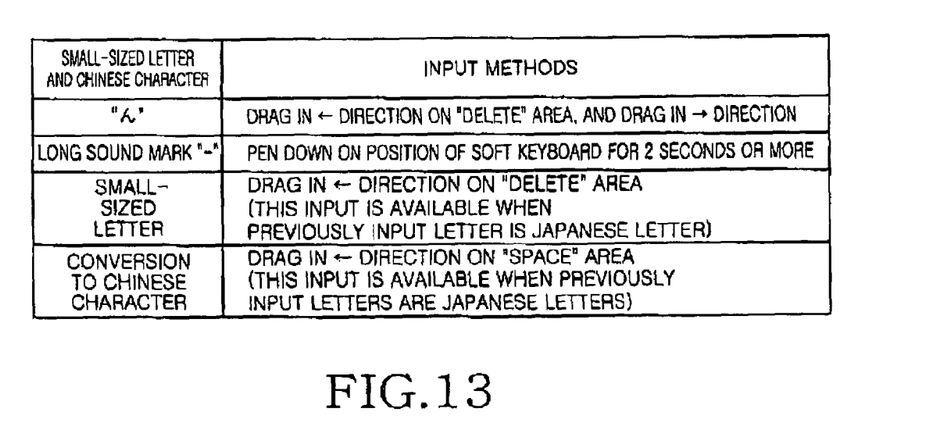
FIG. 13 is a table illustrating a method for inputting a letter "ん", a "long" sound mark, a small-sized letter and a Chinese character in accordance with the second embodiment of the present invention.

A method for inputting a letter "ん", a long sound mark "-", a small-sized letter, and for converting Japanese letters to a Chinese character in relation to the Japanese language will be described with reference to FIG. 13 in accordance with the second embodiment of the present invention.

To input the letter "ん", a pen drag is performed in the direction 10 on the 9$^{th}$ area, another pen drag is performed in the extended letter direction 12, and then a pen-up operation is performed. Further, the long sound mark "-" can be input by a pen-down operation performed at any position of the soft keyboard for 2 seconds or more followed by a pen-up operation. Further still, when a pen drag is performed in the direction 10 on the 9$^{th}$ area and a pen-up operation is performed, the previously inputted and displayed Japanese letter is converted into a small-sized letter. Still further, when a pen drag is performed in the direction 10 on the 12$^{th}$ area and a pen-up operation is performed, the previously inputted and displayed Japanese letters can be converted into Chinese character.

As apparent from the above description, the present invention can reduce a size of a soft keyboard for inputting letters that is displayed on a touch screen, and recognize language mode switching according to a pen drag direction without a special operation for switching a language mode, such that a user can quickly and correctly input desired letters.

The present invention can reduce the number of keys of a soft keyboard and a size of the soft keyboard by dividing first language consonant letters into a plurality of pairs of basic consonant letters and extended consonant letters, mapping and assigning basic consonant letters and extended consonant letters contained in second language consonant letters to the basic consonant letters and extended consonant letters contained in the first language consonant letters, and displaying letter input areas.

The basic consonant letters of the first language are mapped to the extended consonant letters thereof according to similar forms. A basic consonant letter and extended consonant letter of the first language form a group along with a basic consonant letter and extended consonant letter of the second language corresponding to pronunciations thereof, and the formed group is displayed, such that the user can easily remember keys of the soft keyboard. Furthermore, the letters can be inputted according to pen drag directions, such that the probability of an erroneous input can be significantly reduced, and an input speed can be significantly improved.

Although the preferred embodiments of the present invention have been disclosed for illustrative purposes, those skilled in the art will appreciate that various modifications, additions and substitutions are possible, without departing from the scope of the invention. For example, language mode switching operations between the English and Korean language modes and between the English and Japanese language modes have been described, but a language mode switching operation between two or more language modes can be applied to the present invention. Accordingly, the present invention is not limited to the above-described embodiments, but the present invention is defined by the claims which follow, along with their full scope of equivalents.

What is claimed is:

1. An apparatus for letter recognition in a terminal equipped with a touch screen, comprising:
    a user interface having a plurality of letter input areas displayed on the touch screen, the plurality of letter input areas each having a pair of first language consonant letters comprising a basic consonant letter and an extended consonant letter, wherein each extended consonant letter has a form similar to a corresponding basic consonant letter, and wherein the basic consonant letters and the extended consonant letters of the first language are mapped and assigned to basic consonant letters and extended consonant letters of a second language; and
    a controller for selecting one of the consonant letters assigned to a letter input area corresponding to a touch pen input type and enabling display of the selected consonant letter.

2. The apparatus as set forth in claim 1, wherein the controller enables display of a basic consonant letter of the first language assigned to a corresponding letter input area when the touch pen input type is a pen click.

3. The apparatus as set forth in claim 1, wherein the controller enables display of a basic consonant letter of the second language corresponding to a displayed basic consonant letter or extended consonant letter of the first language when a pen touch input type outputted from the user interface is a pen drag in a direction of conversion to a Korean language after the basic consonant letter or extended consonant letter of the first language assigned to one letter input area has been displayed.

4. The apparatus as set forth in claim 1, wherein the controller enables display of an extended letter corresponding to a displayed basic consonant letter when a pen touch input type outputted from the user interface is a pen drag in an extended letter direction after the basic consonant letter of the first or second language assigned to a letter input area has been displayed.

5. The apparatus as set forth in claim 1, wherein the controller enables display of a previously assigned vowel letter of the first language according to a vowel letter direction when the touch pen input type is a pen drag in the vowel letter direction.

6. The apparatus as set forth in claim 5, wherein the pen drag in the vowel letter direction can be performed on any letter input area.

7. The apparatus as set forth in claim 5, wherein the controller enables display of a basic vowel letter of the second language mapped and assigned to a displayed vowel letter of the first language when a pen touch input type outputted from the user interface is a pen drag in a language conversion direction after the vowel letter of the first language assigned to one letter input area has been displayed.

8. The apparatus as set forth in claim 7, wherein the controller enables display of an extended vowel letter of the second language corresponding to the displayed basic vowel letter when a pen touch input type outputted from the user interface is a pen drag in an extended letter direction after the basic vowel letter of the second language assigned to one letter input area has been displayed.

9. The apparatus as set forth in claim 1, wherein having a form similar to a corresponding basic letter comprises at least one of requiring one or two additional strokes than are required to form the corresponding basic letter, having a left and right asymmetric form with respect to the corresponding basic letter, and having a repeat form of the corresponding basic letter.

10. An apparatus for letter recognition in a terminal equipped with a touch screen, comprising:
- a user interface having a plurality of letter input areas displayed on the touch screen, the plurality of letter input areas each having a pair of first language consonant letters comprising a basic consonant letter and an extended consonant letter, wherein each extended letter has a form similar to a corresponding basic letter, and wherein the basic consonant letters and the extended consonant letters of the first language are mapped and assigned to basic consonant letters and extended consonant letters of a second language; a display unit for displaying letters to be inputted by the user interface; and
- a controller for selecting one of the consonant letters assigned to a letter input area corresponding to a touch pen input type to enable display of the selected consonant letter, and enabling display of a previously assigned vowel letter of the first language according to a vowel letter direction when the touch pen input type is a pen drag in the vowel letter direction.

11. The apparatus as set forth in claim 10, wherein the controller enables display of a basic consonant letter of the first language assigned to a corresponding letter input area when the touch pen input type is a pen click.

12. The apparatus as set forth in claim 10, wherein the controller enables display of a basic consonant letter of the second language corresponding to a displayed basic letter or extended letter of the first language when a pen touch input type outputted from the user interface is a pen drag in a language conversion direction after the basic letter or extended letter of the first language has been displayed.

13. The apparatus as set forth in claim 10, wherein the controller enables display of an extended letter corresponding to a displayed basic letter when a pen touch input type outputted from the user interface is a pen drag in an extended letter direction after the basic letter of the first or second language has been displayed.

14. The apparatus as set forth in claim 10, wherein having a form similar to a corresponding basic letter comprises at least one of requiring one or two additional strokes than are required to form the corresponding basic letter, having a left and right asymmetric form with respect to the corresponding basic letter, and having a repeat form of the corresponding basic letter.

15. A method for letter recognition in a terminal equipped with a touch screen, comprising the steps of:
- (a) preparing a user interface having a plurality of letter input areas displayed on the touch screen, the plurality of letter input areas each having a pair of first language consonant letters comprising a basic consonant letter and an extended consonant letter, wherein each extended letter has a form similar to a corresponding basic letter, and wherein the basic consonant letters and the extended consonant letters of the first language are mapped and assigned to basic consonant letters and extended consonant letters of a second language;
- (b) selecting one of the consonant letters assigned to a letter input area corresponding to a touch pen input type; and
- (c) enabling a display of the selected consonant letter.

16. The method as set forth in claim 15, wherein step (b) comprises the step of:
enabling display of a basic consonant letter of the first language assigned to a corresponding letter input area when the touch pen input type is a pen click.

17. The method as set forth in claim 15, wherein step (b) comprises the step of:
enabling display of a basic consonant letter of the second language mapped and assigned to a displayed consonant letter of the first language when the pen touch input type outputted from the user interface is a pen drag in a language conversion direction after the consonant letter of the first language assigned to one letter input area has been displayed.

18. The method as set forth in claim 15, wherein step (b) comprises the step of:
enabling display of an extended letter corresponding to a displayed basic consonant letter when a pen touch input type outputted from the user interface is a pen drag in an extended letter direction after the basic consonant letter of the first or second language assigned to the letter input area has been displayed.

19. The method as set forth in claim 15, wherein step (b) comprises the step of:
enabling the display of a previously assigned vowel letter of the first language according to a vowel letter direction when the touch pen input type is a pen drag in the vowel letter direction.

20. The method as set forth in claim 19, wherein the step of displaying the previously assigned vowel letter of the first language according to the vowel letter direction comprises the step of:
enabling the display of a basic consonant letter of the second language mapped and assigned to a displayed vowel letter of the first language when a pen touch input type outputted from the user interface is a pen drag in a language conversion direction when the vowel letter of the first language assigned to one letter input area has been displayed.

21. The method as set forth in claim 20, further comprising the step of:
(c) enabling the display of an extended vowel letter of the second language corresponding to the displayed basic vowel letter when a pen touch input type outputted from the user interface is a pen drag in an extended letter direction after the basic vowel letter of the first language assigned to one letter input area has been displayed.

* * * * *